(12) United States Patent
Zanin et al.

(10) Patent No.: US 8,935,320 B2
(45) Date of Patent: Jan. 13, 2015

(54) METHOD, APPARATUS AND SYSTEM FOR MEDIA POSITION CONTROL

(75) Inventors: Aurelie Zanin, Ramdala (SE); Hongxia Long, Kunshan (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 44 days.

(21) Appl. No.: 13/501,469

(22) PCT Filed: Oct. 21, 2009

(86) PCT No.: PCT/CN2009/001166
§ 371 (c)(1),
(2), (4) Date: Apr. 12, 2012

(87) PCT Pub. No.: WO2011/047499
PCT Pub. Date: Apr. 28, 2011

(65) Prior Publication Data
US 2012/0203830 A1  Aug. 9, 2012

(51) Int. Cl.
G06F 15/173 (2006.01)
H04N 21/643 (2011.01)
H04L 29/08 (2006.01)
H04L 29/06 (2006.01)
H04N 21/6437 (2011.01)
H04N 21/6587 (2011.01)

(52) U.S. Cl.
CPC ........ *H04N 21/643* (2013.01); *H04L 29/08072* (2013.01); *H04L 29/06* (2013.01); *H04N 21/6437* (2013.01); *H04N 21/6587* (2013.01)
USPC ............ 709/203; 709/206; 709/220; 709/228

(58) Field of Classification Search
CPC .............. H04L 29/08072; H04L 29/06; H04L 29/0809; H04L 29/06047; G06Q 30/02; H04N 21/643; H04N 21/6857; H04N 21/6437
USPC ................ 709/203, 205, 206, 208, 220, 228; 382/186
See application file for complete search history.

(56) References Cited

U.S. PATENT DOCUMENTS

| | | | |
|---|---|---|---|
| 6,496,980 B1 * | 12/2002 | Tillman et al. | 725/90 |
| 7,051,110 B2 | 5/2006 | Hagai et al. | |
| 8,040,279 B2 * | 10/2011 | Jo | 342/420 |
| 8,514,891 B2 * | 8/2013 | Green et al. | 370/486 |
| 2009/0058729 A1 * | 3/2009 | Jo | 342/387 |
| 2010/0235915 A1 * | 9/2010 | Memon et al. | 726/23 |

FOREIGN PATENT DOCUMENTS

| | | |
|---|---|---|
| CN | 1980390 | 6/2007 |
| CN | 101287107 | 10/2008 |

OTHER PUBLICATIONS

International Search Report for PCT/CN2009/001166, mailed Jul. 29, 2010.
English Translation of Chinese Search Report dated Mar. 24, 2014 Chinese Application No. 2009-80162126.6.

* cited by examiner

*Primary Examiner* — Khanh Dinh
(74) *Attorney, Agent, or Firm* — Nixon & Vanderhye P.C.

(57) ABSTRACT

An apparatus, system, method, server, and client are provided for media position control. A client sends to a player a request for setting up a streaming session, and the streaming session is set up between the player and a server. A communication channel is set up between the client and the server. An interfacing message is defined and communicated between the client and the server over the communications channel that indicates a read position in a media. A continuous stream is created in the server in accordance with the read position.

25 Claims, 6 Drawing Sheets

METHOD, APPARATUS AND SYSTEM FOR MEDIA POSITION CONTROL

This application is the U.S. national phase of International Application No. PCT/CN2009/001166 filed 21 Oct. 2009 which designated the U.S., the entire contents of which is hereby incorporated by reference.

FIELD OF THE INVENTION

The present disclosure pertains to the field of media position control, and more particularly to the method, apparatus and system for media position control without media player support.

DESCRIPTION OF RELATED ART

1. Technical Background on Streaming Technology

The basic principle of the most common streaming technologies such as RTP streaming is to send media from a sender to a receiver as a stream of data packets. Received packets are usually stored in a buffer before being played. The packets are continuously numbered using sequence numbers to allow the receiver to order the packets and know if any of them was lost during transmission. Each packet also has a timestamp that relates packets to each other in time and can be used by the receiver to know at what time a packet should be played. In that way, each packet is played at the right time despite any irregularity in the stream.

FIG. 1 shows a model of a player buffer with a jump in the timestamp and sequence number. In FIG. 1, incoming data packets are stored in free space of the buffer, and the decoder decodes the data packets based on timestamps. As illustrated in FIG. 1, a jump occurs between Data Packets 5 and 7. As such, no media data will be played during Data Packet 6. Prior to display of Data Packet 7, decoding will wait for the time inferred by the timestamp of Data Packet 7. Accordingly, the packet with the sequence number 6 has been lost during the transmission.

In the case of RTP streaming, data packets follow the RTP protocol as described in RFC 3550 and the setup of a transmission channel between the sender and the receiver is done via a RTSP session as described in RFC 2326.

The RTSP session setup procedure implemented in a media player can be summarized into the following steps as illustrated in FIG. 2:

201. An RTSP describe request is sent to the streaming server (receiver).
202. The session description information is sent in the ok response. It contains information on media streams available for this session.
203-206. The player indicates to the streaming server which media stream it needs to receive and how to receive the media stream. In the example of FIG. 2, an audio stream (203-204) and a video stream (205-206) are set up.
207-209. An RTSP play request (207) is sent to trigger the start of the RTP packets delivery to the player. Once acknowledged by the server (208), media is transmitted to the player (209).

The steps of 201-202 are optional and the session description information can be received by other means.

2. Technical Background on Media Position Control

In the context of media streaming, functionalities such as Fast Forward and Rewind are necessary to reach expected DVD like user experience. Those features are usually offered by the media player in the terminal. In case a client is developed to run on the terminal, an API to control the player needs to be made available for the developer, e.g. a Java API. Similarly, an interfacing message needs to be made available to control the embedded player for a browser based implementation of the client. All of the above solutions require support of the media player.

Solution 1 Based on RFC 2326

According to the RFC 2326, the player can send an RTSP PLAY request which includes a "scale" header. If the scale value is >1, the streaming server will increase accordingly the sending speed value. The support for the scale parameter is optional on both sender and receiver sides.

An example of Fast Forward flow based on the RFC 2326 is illustrated in FIG. 3.

In Step 301, the client calls the control API shown on the player to start a streaming session. A transmission channel between the player and the server is set up (302) as described previously according to FIG. 2. At that stage the sending rate is the same as the media display rate (303).

In the course of the normal viewing, the end-user triggers the client to fast forward. The client calls the control API (304) to change the server's media sending rate. In turn, the player sends an RTSP play request to the server with a new scale value (305) as recommended in the RFC 2326. The server acknowledges the request (306) and adjusts the sending rate (307).

When the desired media position is reached, the end-user triggers the client to resume streaming normally. The client calls the player control API (308) which in turn sends an RTSP play request to the server with a scale value equal to 1 (309). The server acknowledges the request (310) and adjusts the sending rate to match the media display rate (311).

Note that in the above example, the server needs to be able to adapt the RTP stream so that the sending rate stays within the bandwidth requirement. This can be made possible by dropping intermediate packets. To describe this process, a fast forward example regarding a video stream is described below. FIGS. 4A, 4B, 5A, 5B should be read from left to right.

In FIG. 4A, the player received the frames from left to right. There is no missing packet.

FIG. 4B illustrates what an end-user would see on its screen.

In FIG. 5A, the server dropped intermediate packets (1 out of 2 in this example) in order to satisfy the bandwidth limitation in a context where the sending rate is faster than the media rate.

FIG. 5B illustrates what the end-user would see on the screen during the Fast Forward process.

Solution 2 Based on RFC 2326

An alternative solution to control the media position is for the player to pause the stream and then send a Play request indicating the point in time at which the user wishes to resume playing.

FIG. 6 illustrates a fast forward example based on the RTSP range header. The RTSP session setup procedures 601, 602, 603 are the same as those of FIG. 3, while the differences lie in the way the media goes to a new media position. In the course of the normal viewing, if a new media position is desired, the client can call the API 4 which in turn triggers the protocol procedure 605, 606 to pause the media at the server, and call the API 607 to set a new media position in the forward direction or the backward direction which in turn triggers the protocol procedure 608, 609 to play the media from the new media position, whereupon the new RTP data flow 610 starts from the desired media position.

The support for the Pause request is recommended and the support for the Range header is optional on both sender and receiver sides.

Few handsets on the market support easily the control of the media player either by lack of support in the player itself (necessary part of the RTSP protocol not implemented), or by lack of the appropriate API. This has an important impact on the user experience and makes porting of a client on new handsets difficult and rely on terminal capabilities.

SUMMARY OF THE INVENTION

In view of the above-described problems, it is an objective of the invention to design a new way to implement navigation within a media which does not rely on terminal capabilities and in particular in player support.

In that solution, the client would send a request outside the streaming session scope to play from a particular point in the media stream.

The streaming server would identify the play position in the media source and start forwarding the RTP packets from that point in time.

In order for the change to be transparent to the player, the streaming server needs to update the timestamps and sequence numbers of the RTP packets so that the stream is continuous.

If this update is not done, the decoding process will wait until reaching the play position.

In the first aspect, the present invention provides a method for media position control, comprising:

a client sending to a player a request for setting up a streaming session;

setting up the streaming session between the player and a server;

setting up a communication channel between the client and the server;

defining an interfacing message between the client and the server for indicating a read position in a media; and creating a continuous stream in the server in accordance with the read position.

According to a certain embodiment, setting up a communication channel between the client and the server comprises: providing in the client a second transmitter for stream control, providing in the server a second receiver for stream control, and configuring the second transmitter and the second receiver to be in direct communication.

According to a certain embodiment, the interfacing message is pairs of commands and parameters which can be carried in the HTTP request URI or in separate HTTP headers.

According to a certain embodiment, the interfacing message comprises a value from a known point to the read position.

According to a certain embodiment, the value is a time value or a position value.

According to a certain embodiment, the known point is a current media position, the beginning of the media or the end of the media, or any other reference point.

According to a certain embodiment, creating a continuous stream in the server in accordance with the read position comprises finding the read position in the media, and updating timestamps and sequence numbers of data packets in the stream to make the data packets continuous.

According to a certain embodiment, the interfacing message is extended to include a command to be responded with a current read position of the media.

In the second aspect, the present invention provides an apparatus for media position control, comprising:

means for enabling a client to send to a player a request for setting up a streaming session;

means for setting up the streaming session between the player and a server;

means for setting up a communication channel between the client and the server;

means for defining an interfacing message between the client and the server, the interfacing message indicating a read position in a media; and means for creating a continuous stream in the server in accordance with the read position.

According to a certain embodiment, the means for setting up a communication channel between the client and the server comprises: a second transmitter for stream control provided in the client, a second receiver for stream control provided in the server, and means for configuring the second transmitter and the second receiver to be in direct communication.

According to a certain embodiment, the means for creating a continuous stream in the server in accordance with the read position comprises: means for finding the read position in the media; and means for updating timestamps and sequence numbers of data packets in the stream to make the data packets continuous.

According to a certain embodiment, the means for defining an interfacing message between the client and the server further comprises means for extending the interfacing message to include a command to be responded with a current read position of the media.

In the third aspect, the present invention provides a system for media position control, comprising:

a client, a player, a server, the player being coupled to the client and the server, and a communication channel for coupling the client to the server.

According to a certain embodiment, the server comprises a processor, the processor including means for creating a continuous stream.

According to a certain embodiment, the means for creating a continuous stream comprises: means for finding the read position in the media, and means for updating timestamps and sequence numbers of data packets in the stream to make the data packets continuous.

According to a certain embodiment, the server further comprises a first receiver for data transmission channel setup and a second receiver for stream control both coupled to the processor, wherein the client comprises a first transmitter, and a second transmitter for stream control, and wherein the communication channel is established between the second transmitter and the second receiver.

According to a certain embodiment, the server further includes a memory coupled to the processor and a third transmitter for media stream output, wherein the client further comprises a user interaction coupled to the first transmitter and the second transmitter.

In the fourth aspect, the present invention provides a server in a system for media position control, the server comprising:

a processor for creating a continuous stream;

a first receiver for setting up a streaming session and a second receiver for setting up a communication channel with a corresponding transmitter of a client to perform stream control, the first and second receivers coupled to the processor.

According to a certain embodiment, the processor comprises means for creating a continuous stream, the means for creating a continuous stream including: means for finding the read position in the media, and means for updating timestamps and sequence numbers of data packets in the stream to make the data packets continuous.

According to a certain embodiment, the server further comprises: a memory and a third transmitter for media output, both coupled to the processor.

In the fifth aspect, the present invention provides a client in a system for media position control, the client comprising:

a first transmitter for setting up a streaming session;

and a second transmitter for setting up a communication channel with a corresponding receiver of a server to perform stream control by sending requests outside the streaming session to play from a particular point in the media stream.

According to a certain embodiment, the client further comprises: a user interaction coupled to the first and second transmitters.

In the sixth aspect, the present invention provides an application of the method according to the above methods in packet switched network.

In the seventh aspect, the present invention provides a continuous data service provided using the above methods.

According to a certain embodiment, the continuous data service is a real time continuous data service.

In the eighth aspect, the present invention provides an article of manufacture including code for a hardware transaction and a software transaction that is configured to cause operations to be performed, the operations comprising:

a client sending to a player a request for setting up a streaming session;

setting up the streaming session between the player and a server;

setting up a communication channel between the client and the server;

defining an interfacing message between the client and the server for indicating a read position in a media; and creating a continuous stream in the server in accordance with the read position.

According to a certain embodiment, setting up a communication channel between the client and the server comprises: providing in the client a second transmitter for stream control, providing in the server a second receiver for stream control, and configuring the second transmitter and the second receiver to be in direct communication.

According to a certain embodiment, the interfacing message is pairs of commands and parameters which can be carried in the HTTP request URI or in separate HTTP headers.

According to a certain embodiment, the interfacing message comprises a value from a known point to the read position.

According to a certain embodiment, the value is a time value or a position value.

According to a certain embodiment, the known point is a current media position, the beginning of the media or the end of the media, or any other reference point.

According to a certain embodiment, creating a continuous stream in the server in accordance with the read position comprises finding the read position in the media, and updating timestamps and sequence numbers of data packets in the stream to make the data packets continuous.

According to a certain embodiment, the interfacing message is extended to include a command to be responded with a current read position of the media.

The advantage of this invention resides in the design of a media control solution which provides optimized user experience while being independent from the player implementation and eventual terminal limitations.

BRIEF DESCRIPTION OF THE FIGURES

The present invention is illustrated by way of example but not limited to the accompanying drawings.

DETAILED DESCRIPTION

Figure 1:
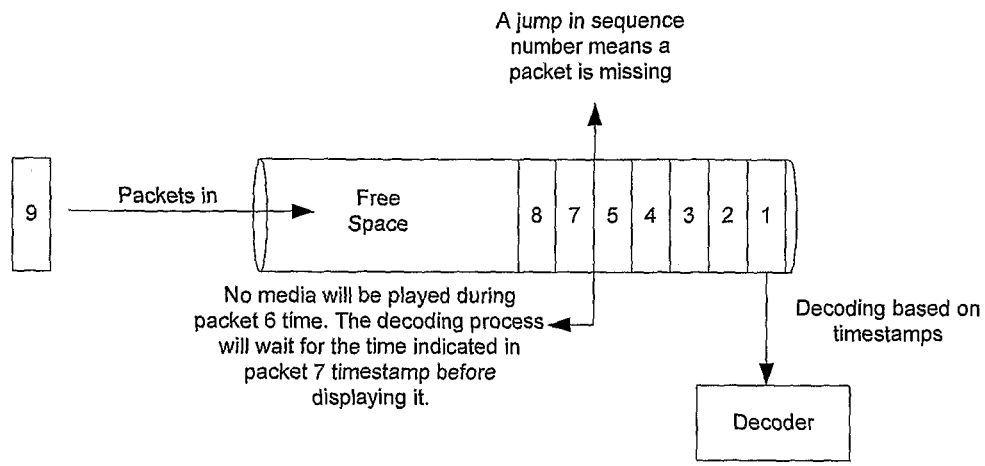
FIG. 1 shows a model of a player buffer with a jump in the timestamp and sequence number according to the prior art.

The implementation requires:

1) A direct communication channel set up between a client and a server.

2) An interfacing message defined between the client and the server to indicate a read position within a media clip. An embodiment of the interfacing message is pairs of commands and parameters, which can be carried in the HTTP request URI or even in separate HTTP headers provided that HTTP is chosen as one of the implementations of the protocols. The choice of a protocol used between the client and the server is flexible. One possible choice is to use the HTTP protocol, but the invention is not limited to it.

3) A method to create a continuous stream. The method comprising: updating the sequence numbers and timestamps of data packets to keep the data stream continuous. However, the method is not limited to this. In case of different protocols adopted, the methods to create a continuous stream could be somewhat different. For example, in RTP streaming, a continuous stream is created by changing sequence numbers and timestamps of data packets, whereas in flash RTMP streaming only the timestamps of data packets are changed due to the absence of sequence numbers on application level therefrom. In sum, whichever protocol is adopted is within the scope of the present invention as long as the data stream is made continuous by virtue of the characteristics of the employed particular protocol.

In order to control the media position, the interfacing message needs transmitting a required read point either as an absolute value—time or position from the beginning of the media—or as a time or position value relative to a known point such as the last read time or position.

Examples of the interfacing message are given below.

In the first example, the read point of the media stream is transmitted in the HTTP request URI as a relative value from the last read position. The parameter's name is "skip". A positive value of the parameter induces a fast forward action whereas a negative value triggers a rewind action. The unit of the read position is seconds.

Fast Forward:
Client→Server: GET http://server.com?skip=3 HTTP/1.1
Server→Client: 200 OK The client sends an HTTP request to the server to trigger a fast forward action of 3 seconds compared to the current media position. The server acknowledges the reception of the request with a 200 OK response.

Rewind:
Client→Server: GET http://server.com?skip=−3 HTTP/1.1
Server→Client: 200 OK The client sends an HTTP request to the server to trigger a rewind action of 3 seconds compared to the current media position. The server acknowledges the reception of the request with a 200 OK response.

In the second example, the read point of the media stream is transmitted in the HTTP request URI as an absolute value. The parameter's name is "goTo". The unit of the read position is seconds. Depending of the initial read position, the action triggered is either a fast forward or a rewind action.

Client→Server: GET http://server.com?goTo=360 HTTP/1.1
Server client→C: 200 OK

It would be understood by persons skilled in the art that although jump intervals are determined through time units in the examples above, the present invention is not limited to this; for example, jump intervals may also be determined through the number of packets or frames. Of course, other units may also be employed to determine jump intervals in line with different protocols in use and media types.

The client sends an HTTP request to the server to control the media position. Here the server resumes streaming at the 360$^{th}$ second of the media. If the 200$^{th}$ second was initially played, it results in a fast forward action. If the 400$^{th}$ second was initially played, it results in a rewind action. The server acknowledges the reception of the request with a 200 OK response.

The interfacing message described above should be valid for any type of navigation control. That includes the Fast Forward and Rewind functionalities as described in the above example but is not limited to those two features. The bookmark feature where the display of the media starts from a recorded position instead of the beginning of the media could be another use case.

It is also recommended to extend the interfacing message so that the client can know the media position at any point in time as it will not be possible to rely on the player to get that information. The extended interfacing message is composed of a command to be responded with a current read position of the media. The unit of the read position needs to be predefined. An example is given below:

Client→Server: GET http://server.com?mediaStatus HTTP/1.1
Server→Client: 200 OK position=363

The client sends an HTTP request to the server to query the current media read position. The server acknowledges the reception of the request with a 200 OK response and includes in the header or body of its response the value of the current read position, here 363 seconds.

A mechanism to relate the transmission channel initially created to the navigation request might finally be required. A user ID such as MSISDN can be used to build that relation by appending the user ID to each request sent from the client. Here is an example of an extended interfacing message:

Client→Server: GET http://server.com?skip=3&userID=xxx HTTP/1.1

In the HTTP skip command, the parameter userID informs the server of which transmission channel the request is related to.

Note that though RTP streaming is used through the document as an example, the invention is not restricted to it and could be applied to other types of streaming such as flash streaming.

Figure 7:
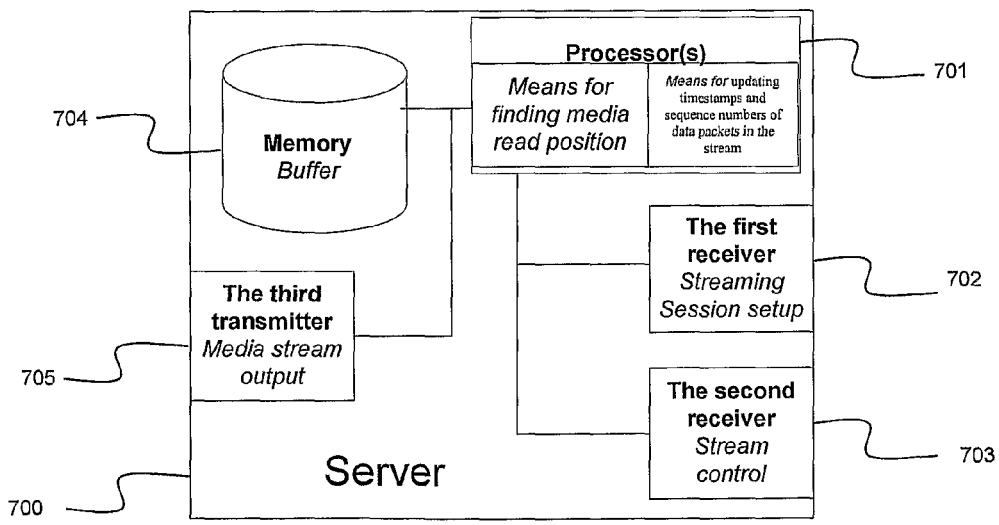
FIG. 7 shows a schematic structure of the server according to the present invention.

FIG. 7 shows a schematic structure of the server according to the present invention. A server 700 comprises: a memory 704 which may serve as a buffer, a processer (or processors) 701 for creating a continuous data stream, a first receiver 702 for setting up a streaming session, a second receiver 703 for performing stream control, and a third transmitter 705 for performing media stream output. The packets need to be stored in the memory before being forwarded. The memory can refer to an actual file or a short time memory or a database or any other types of media such as magnetic storage medium (e.g., hard disk drives, floppy disks, tape, etc.), volatile and non-volatile memory devices (e.g., EEPROMs, ROMs, PROMs, RAMs, DRAMs, SRAMs, Flash Memory, firmware, programmable logic, etc.), etc. The memory 704 is coupled to the processor 701 and the third transmitter 705, and the processor 701 is coupled to the first receiver 702 and the second receiver 703. In the server, the second receiver is provided for the implementation of the media position control mechanism of the present invention, and for the setup of a communication channel with a corresponding second transmitter in the client. Operations of the second receiver are transparent to the first receiver. It should be appreciated that the structure shown in FIG. 7 is only illustrative. The server of the present invention may comprise more or less means than those described in FIG. 7 in accordance with circumstances. The processor may comprise means for finding the read position in the media and means for changing sequence numbers of data packets and timestamps of data packets. As regards the present invention, the essential means include the processor 701 for creating a continuous data stream, the first receiver 702 for setting up a streaming session, and the second receiver 703 for performing stream control.

Figure 8:
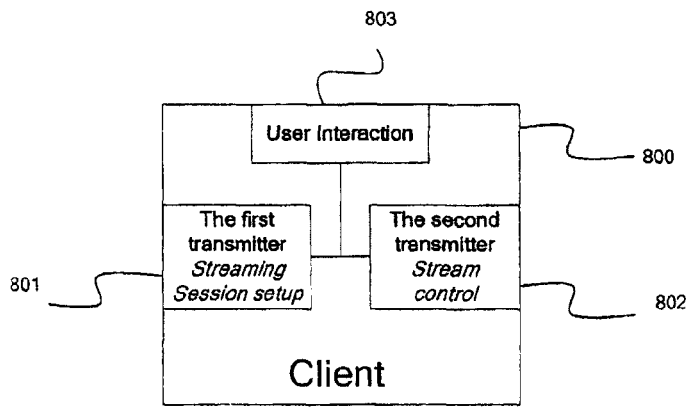
FIG. 8 shows a schematic structure of the client according to the present invention.

FIG. 8 shows a schematic structure of the client according to the present invention. A client 800 comprises: a first transmitter 801 for setting up a streaming session, a second transmitter 802 for setting up a communication channel with a corresponding receiver of a server to perform stream control by sending requests outside the streaming session to play from a particular point in the media stream, and a user interaction 803 for interacting with the user. The first transmitter 801 and the second transmitter 802 are coupled to the user interaction 803. In the client, the second transmitter is provided for the implementation of the media position control mechanism of the present invention, and for the setup of a communication channel with a corresponding second receiver in the server. Operations of the second transmitter are transparent to the first transmitter. It should be appreciated that the structure shown in FIG. 8 is only illustrative. The client of the present invention may comprise more or less means than those described in FIG. 8 in accordance with circumstances. As regards the present invention, the essential means include the first transmitter 801 for setting up a streaming session, and the second transmitter 802 for performing stream control.

Figure 9:
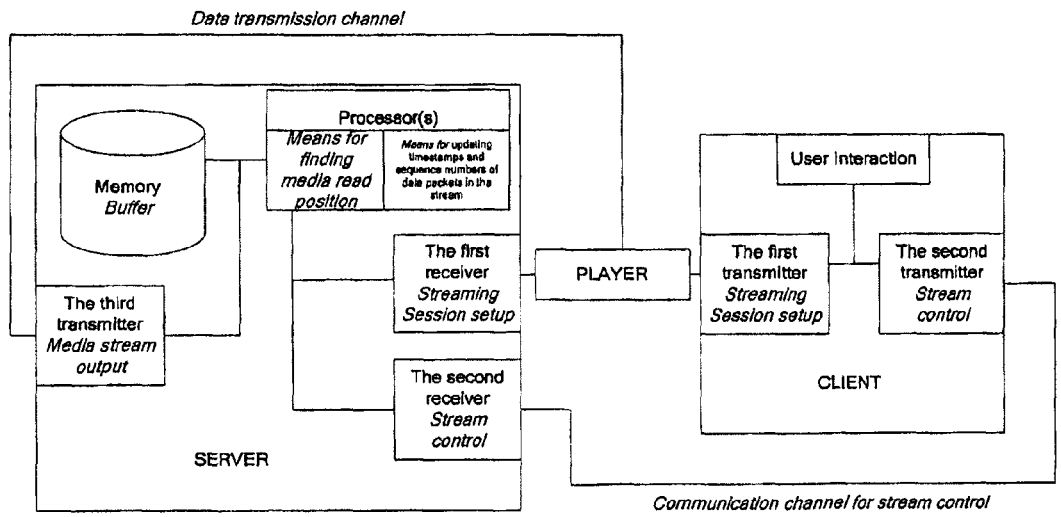
FIG. 9 is a block diagram of a system for media position control according to one embodiment of the present invention.

FIG. 9 is a block diagram of a system for media position control according to one embodiment of the present invention. As shown in the figure, the system comprises a client, a player, a server, the player being coupled to the client and the server, and a communication channel for coupling the client to the server. The server comprises a processor (or processors) including means for creating a continuous stream, the means for creating a continuous stream comprises: means for finding the read position in the media and means for changing sequence numbers of data packets and timestamps of data packets to make the data packets continuous, and the server further comprises a first receiver for data transmission channel setup and a second receiver for stream control both coupled to the processor. The client comprises a first transmitter, and a second transmitter for stream control. The communication channel is established between the second transmitter and the second receiver. The server further includes a memory and a third transmitter for media stream output coupled to the processor. The client further comprises a user interaction coupled to the first and second transmitters. It should be appreciated that the structure shown in FIG. 9 is only illustrative. The arrangement of the different parts is merely a schematic drawing and may be adapted in accordance with circumstances.

Figure 10:
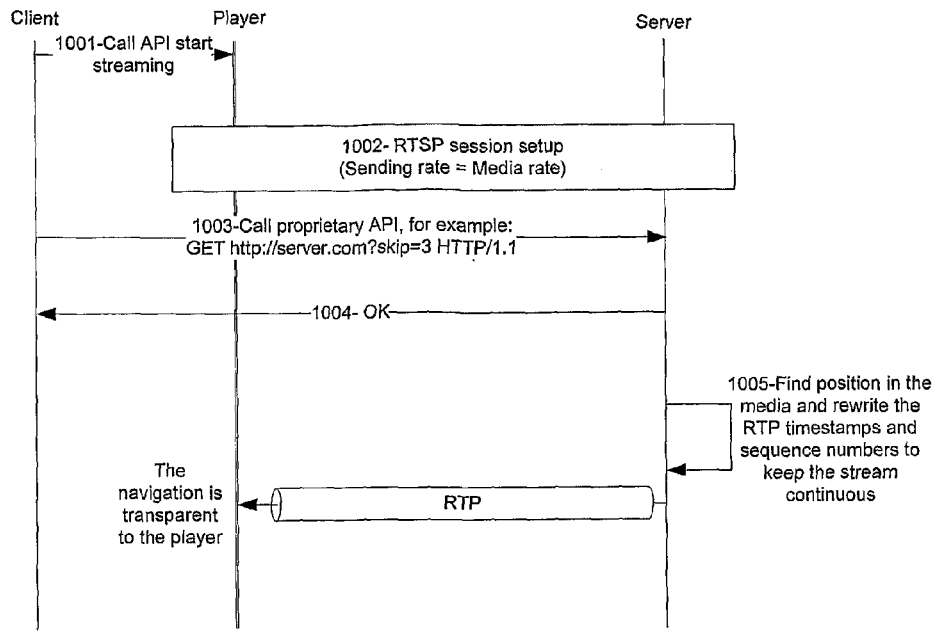
FIG. 10 shows a navigation flow based on internal API call between the Client and the Server (bypassing the Player) according to the present invention.

FIG. 10 shows a navigation flow based on internal API call between the Client and the Server (bypassing the Player) according to the present invention.

Figure 2:
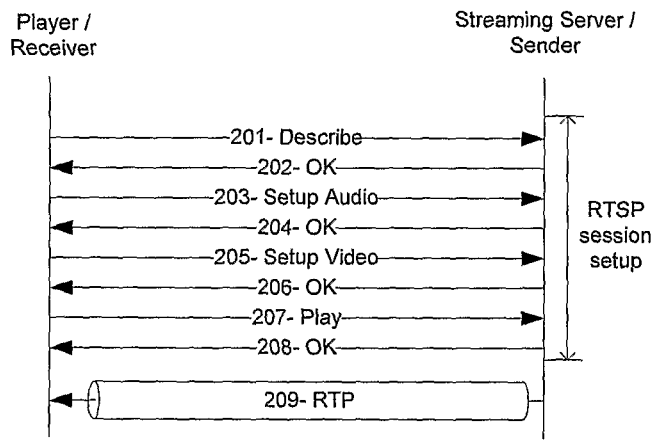
FIG. 2 shows a RTSP session setup procedure implemented in a media player according to the prior art.
Figure 3:
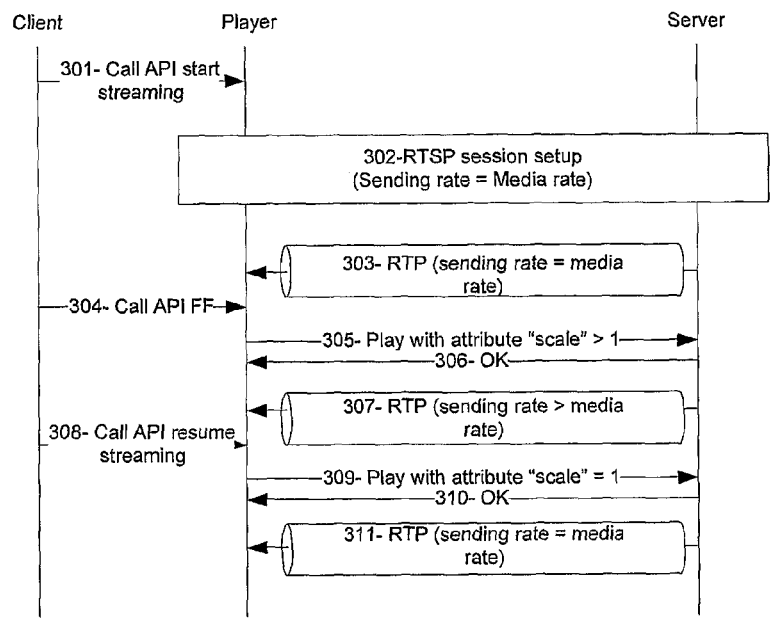
FIG. 3 shows an example of Fast Forward flow based on the RFC 2326.
Figure 4A:
FIG. 4A shows a stream as received by the player when the sending rate is equal to the media rate and no packet is dropped.
Figure 4B:
FIG. 4B shows a stream as displayed by the player according to the data received in FIG. 4A.
Figure 5A:
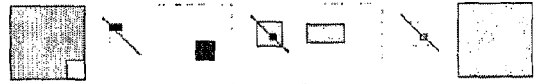
FIG. 5A shows a stream as received by the player when the sending is faster than the media rate.
Figure 5B:
FIG. 5B shows a stream as displayed by the player according to the data received in FIG. 5A.
Figure 6:
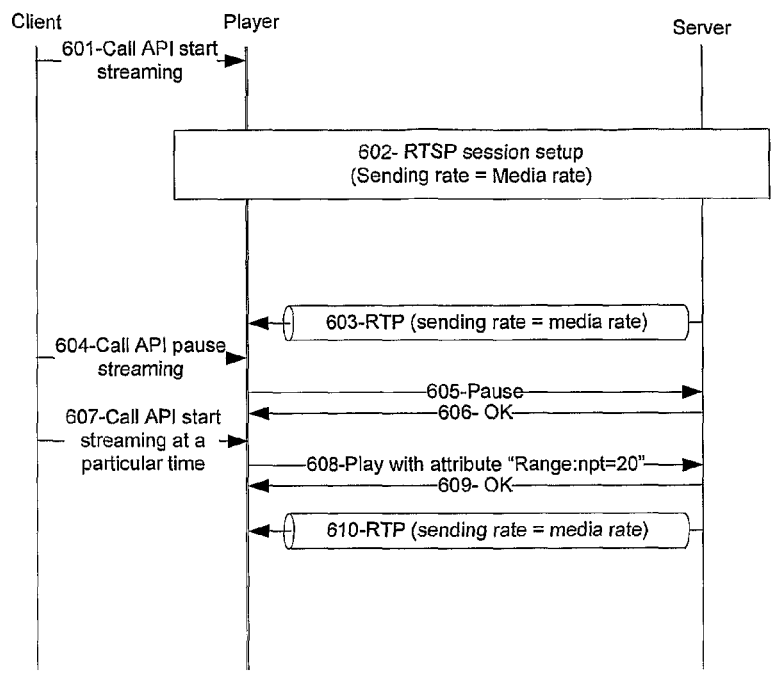
FIG. 6 illustrates a fast forward example based on the RTSP range header.

In Step 1001, the client calls the control API shown on the player to start a streaming session. A transmission channel between the player and the server is set up (1002) as described previously in FIG. 2.

In the course of the normal viewing, the end-user triggers the client to fast forward by sending requests outside the streaming session to play from a particular point in the media stream. In particular, the client directly calls the server control API (1003) to transmit the request (interfacing message) indicating a new read position. The server acknowledges the request (1004). It finds the new read position in the media (1005) and starts forwarding the requested data packet. The sequence number and timestamp of each forwarded packet are updated in order to keep a continuous stream. A process for finding the read position is to map the format in which the read position is given to the timestamp format and then select from the stream the packet with the closest timestamps (usually the one right before is selected).

A process for changing the sequence numbers, is to take the sequence number of the latest sent packet and change the sequence number of the new selected packet (the closest from the read position) to latest sent sequence number+1 before sending it and so on so that the rule "the sequence number should be increments by one for each RTP data packet" still holds as requested in RFC 3550.

A process for changing the timestamps, is to take the timestamp of the latest sent packet and, based on the media rate, calculate the timestamp for the next packet. The timestamps of the new selected packet must be updated to that calculated value before the packet is sent. Same process applies for each packet so that the rule "The sampling instant MUST be derived from a clock that increments monotonically and linearly in time" still holds as requested in RFC 3550.

Based on certain input such as user interaction, the client can trigger the setup of a transmission channel for media data according to a standardized protocol and then control the media position through a separate interface. The server can setup a transmission channel with a receiver according to the standardized protocol and, based on the commands received via its stream control receiver and the media streams buffered in its memory, can secure the creation of a continuous stream by its processor before forwarding the media stream via its transmitter.

The interfacing message for the communication between the client and the server may be a message in any form as afore exemplified. For example:

Client→Server: GET http://server.com?mediaStatus HTTP/1.1
Server→Client: 200 OK position=363;
Client→Server: GET http://server.com?skip=3&userID=xxx HTTP/1.1
Server→Client: 200 OK;
Client→Server: GET http://server.com?skip=−3 HTTP/1.1
Server→Client: 200 OK;
Client→Server: GET http://server.com?goTo=360 HTTP/1.1
Server client→C: 200 OK;

However, the present invention is not limited to these, as it would be understood by persons skilled in the art that when other protocols are followed for the communication between the client and the server, message in a format corresponding to the protocols followed may be employed for the communication.

Figure 11:
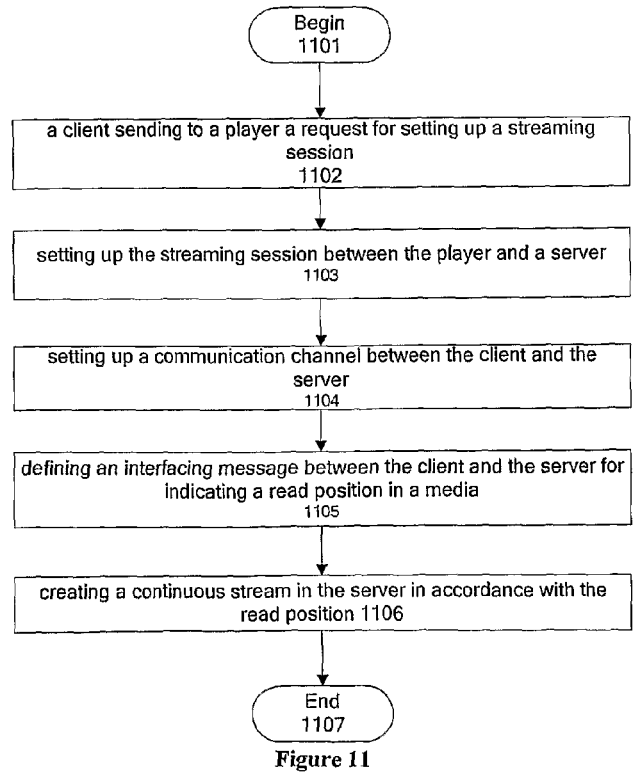
FIG. 11 shows a method for media position control according to one embodiment of the present invention.

FIG. 11 shows a method for media position control according to one embodiment of the present invention. The method starts at Step 1101. At Step 1102, a client sends to a player a request for setting up a streaming session. At Step 1103, the streaming session is set up between the player and a server. At Step 1104, a communication channel is set up between the client and the server. At Step 1105, an interfacing message is defined between the client and the server, indicating a read position in a media. At Step 1106, a continuous stream is created in the server in accordance with the read position. At Step 1107, the method terminates. According to a certain embodiment, setting up a communication channel between the client and the server comprises: providing in the client a second transmitter for stream control, providing in the server a second receiver for stream control, and configuring the second transmitter and the second receiver to be in direct communication.

According to a certain embodiment, the interfacing message is pairs of commands and parameters which can be carried in the HTTP request URI or in separate HTTP headers.

According to a certain embodiment, the interfacing message comprises a value from a known point to the read position. According to a certain embodiment, the value is a time value or a position value. According to a certain embodiment, the known point is a current media position, the beginning of the media or the end of the media, or any other reference point. According to a certain embodiment, creating a continuous stream in the server in accordance with the read position comprises finding the read position in the media, and updating timestamps and sequence numbers of data packets in the stream to make the data packets continuous. According to a certain embodiment, the interfacing message is extended to include a command to be responded with a current read position of the media.

Figure 12:
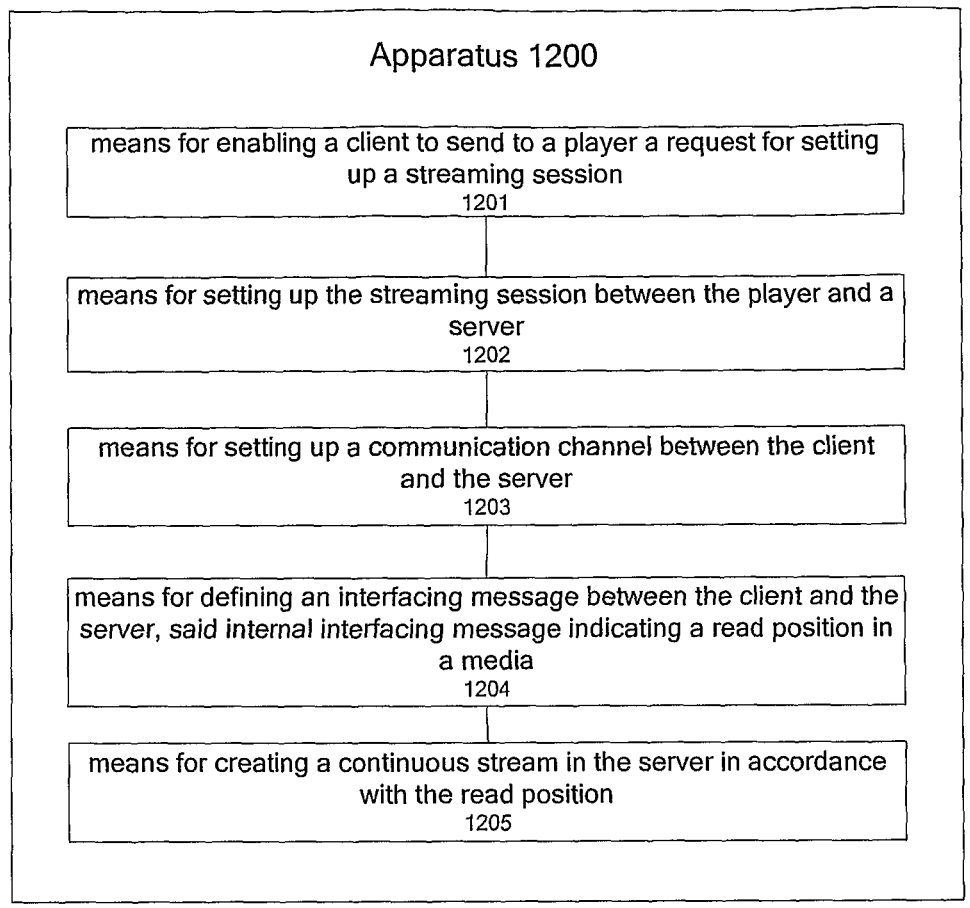
FIG. 12 shows a schematic block diagram of an apparatus for media position control according to one embodiment of the present invention.

FIG. 12 shows a schematic block diagram of an apparatus for media position control according to one embodiment of the present invention. The apparatus 1200 comprises: means 1201 for enabling a client to send to a player a request for setting up a streaming session; means 1202 for setting up a streaming session between the player and a server; means 1203 for setting up a communication channel between the client and the server; means 1204 for defining an interfacing message between the client and the server, the interfacing message indicating a read position in a media; and means 1205 for creating a continuous stream in the server in accordance with the read position. According to a certain embodiment, the means for setting up a communication channel between the client and the server comprises: a second transmitter for stream control provided in the client, a second receiver for stream control provided in the server, and means for configuring the second transmitter and the second receiver to be in direct communication. According to a certain embodiment, the means for creating a continuous stream in the server in accordance with the read position comprises: means for finding the read position in the media; and means for updating timestamps and sequence numbers of data packets in the stream to make the data packets continuous. According to a certain embodiment, the means for defining an interfacing message between the client and the server further comprises means for extending the interfacing message to include a command to be responded with a current read position of the media.

Although the technical solutions of the present invention are described above through certain embodiments, it is to be understood that such embodiments are merely illustrative. Random combinations of the technical features disclosed in the embodiments above may be carried out, without departing from the spirit and scope of the present invention, as long as they are technically feasible.

The described operations may be implemented as a method, apparatus, system or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices, An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to" unless expressly specified otherwise.

The enumerated listing of items does not imply that any or all of the items are mutually exclusive, unless expressly specified otherwise.

The terms "a", "an" and "the" mean "one or more", unless expressly specified otherwise. Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description to the present invention. Since many embodiments of the invention can be made without departing from the spirit and scope of the invention, the invention resides in the claims hereinafter appended.

What is claimed is:

1. An apparatus for media position control, the apparatus comprising:
   a receiver for receiving a request for setting up a streaming session from a client node;
   a server node having one or more data processors configured to:
      set up, over a data transmission channel, the requested streaming session between the client node and the server node;
      set up a communication channel directly between the client node and the server node, the communication channel being separate from the data transmission channel;
      define an interfacing message for transmission over the communications channel between the client node and the server node, said interfacing message indicating a read position in a media;
      find the read position in the media;
      update timestamps and/or sequence numbers of data packets in the stream to make the data packets continuous; and
      create a continuous stream in the server node in accordance with the indicated read position and the updated timestamps and/or sequence numbers; and
   a transmitter for transmitting the continuous stream towards the client node via the data transmission channel.

2. The apparatus according to claim 1, further comprising:
   a receiver for stream control and the configured to be in direct communication with another receiver in the client node.

3. The apparatus according to claim 1, wherein the interfacing message includes a command to be responded to with a current read position of the media.

4. A apparatus according to claim 1, wherein the transmitter is configured to transmit the continuous stream to the client node via a media player unit.

5. The apparatus according to claim 1, further comprising:
   a memory coupled to the processor, and
   wherein the transmitter is configured to transmit media output and is coupled to the processor.

6. A client node for use in a system for media position control, the client node comprising:
   a first transmitter configured to set up a streaming session with a server node over a data transmission channel; and
   a second transmitter configured to set up a communication channel, the communication channel being separate from the data transmission channel, with a corresponding receiver of a server node,
   the client node being configured to send an interfacing message over the communications channel to the server node, said interfacing message indicating a read position in a media to allow the server node to find the read position in the media and/or update timestamps and sequence numbers of data packets in the stream to make the data packets continuous; and
   the client node further configured to receive a continuous stream from the server node via the data transmission channel in accordance with the indicated read position.

7. The client node according to claim 6, wherein the first transmitter is configured to provide streaming session set up and the second transmitter is configured to provide stream control, and wherein the second transmitter is configured to be in direct communication with the second receiver via the communications channel.

8. The client node according to claim 6, wherein said interfacing message includes pairs of commands and parameters which can be carried in an HTTP request URI or in separate HTTP headers.

9. The client node according to claim 6, wherein said interfacing message comprises a value from a known point in the media to the read position.

10. The client node according to claim 9, wherein said value is a time value or a position value.

11. The client node according to claim 9, wherein said known point is a current media position, the beginning of the media or the end of the media, or any other reference point.

12. The client node according to claim 6, wherein the interfacing message is extended to include a command to be responded with a current read position of the media.

13. The client node according to claim 6, wherein the client node is configured to receive the continuous stream via a media player unit.

14. A method implemented in a client node used in a system for media position control, the method comprising the client node:
   setting up a streaming session with a server node over a data transmission channel;
   setting up a communication channel, the communication channel being separate from the data transmission channel, with a corresponding receiver of a server node;
   sending an interfacing message over the communications channel to the server node, said interfacing message indicating a read position in a media to allow the server node to find the read position in the media and update timestamps and/or sequence numbers of data packets in the stream to make the data packets continuous; and
   receiving a continuous stream sent by the server node via the data transmission channel in accordance with the indicated read position.

15. The method according to claim 14, wherein the communications channel directly connects the client node and server node.

16. The method according to claim 14, wherein said interfacing message includes pairs of commands and parameters which can be carried in an HTTP request URI or in separate HTTP headers.

17. The method according to claim 14, wherein said interfacing message comprises a value from a known point in the media to the read position.

18. The method according to claim 17, wherein said value is a time value or a position value.

19. The method according to claim 17, wherein said known point is a current media position, the beginning of the media or the end of the media, or any other reference point.

20. The method according to claim 14, wherein the interfacing message is extended to include a command to be responded with a current read position of the media.

21. The method according to claim 14, wherein the continuous stream sent by the server node is received via a media player unit;

create a continuous stream in the server node in accordance with the indicated read position and the updated timestamps and/or sequence numbers; and a transmitter for transmitting the continuous stream towards the client node via the data transmission channel.

22. A method implemented in a server node providing media position control, the method comprising the serving node:

receiving a request for setting up a streaming session from a client node;

setting up, over a data transmission channel, the requested streaming session between the client node and the server node;

setting up a communication channel directly between the client node and the server node that is separate from the data transmission channel;

defining an interfacing message for transmission over the communications channel between the client node and the server node, said interfacing message indicating a read position in a media;

finding read position in the media; a updating timestamps and/or sequence numbers of data packets in the stream to make the data packets continuous; and creating a continuous stream in the server node in accordance with the indicated read position and the updated timestamps and/or sequence numbers; and transmitting the continuous stream towards the client node via the data transmission channel.

23. The method according to claim 22, further comprising:
a receiver for stream control, and
the receiver being configured to be in direct communication with another receiver in the client node.

24. The method according to claim 22, wherein the interfacing message includes a command to be responded to with a current read position of the media.

25. The method according to claim 22, wherein the continuous stream is transmitted to the client node via media player unit.

* * * * *

UNITED STATES PATENT AND TRADEMARK OFFICE
CERTIFICATE OF CORRECTION

| | | |
|---|---|---|
| PATENT NO. | : 8,935,320 B2 | Page 1 of 1 |
| APPLICATION NO. | : 13/501469 | |
| DATED | : January 13, 2015 | |
| INVENTOR(S) | : Zanin et al. | |

It is certified that error appears in the above-identified patent and that said Letters Patent is hereby corrected as shown below:

In the specification

In Column 11, Line 57, delete "devices," and insert -- devices. --, therefor.

In the claims

In Column 13, Line 40, in Claim 2, delete "and the" and insert -- and is --, therefor.

In Column 13, Line 46, in Claim 4, delete "A apparatus" and insert -- An apparatus --, therefor.

In Column 16, Line 1, in Claim 22, delete "media; a" and insert -- media; --, therefor.

Signed and Sealed this
Sixteenth Day of February, 2016

Michelle K. Lee
*Director of the United States Patent and Trademark Office*